US009771867B2

(12) United States Patent
Karam et al.

(10) Patent No.: US 9,771,867 B2
(45) Date of Patent: Sep. 26, 2017

(54) GAS TURBINE ENGINE WITH AIR/FUEL HEAT EXCHANGER

(71) Applicant: Rolls-Royce North American Technologies, Inc., Indianapolis, IN (US)

(72) Inventors: Michael Abraham Karam, Plainfield, IN (US); Eric Sean Donovan, Fishers, IN (US); Michael Stephen Krautheim, Fountaintown, IN (US); Daniel Kent Vetters, Indianapolis, IN (US); Donald G. Chouinard, Westfield, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 523 days.

(21) Appl. No.: 14/319,680

(22) Filed: Jun. 30, 2014

(65) Prior Publication Data
US 2014/0338334 A1    Nov. 20, 2014

Related U.S. Application Data

(63) Continuation of application No. PCT/US2012/072117, filed on Dec. 28, 2012.
(Continued)

(51) Int. Cl.
*F02C 7/224* (2006.01)
*F02C 7/143* (2006.01)
(Continued)

(52) U.S. Cl.
CPC .............. *F02C 7/224* (2013.01); *F02C 7/141* (2013.01); *F02C 7/143* (2013.01); *F28D 7/0058* (2013.01);
(Continued)

(58) Field of Classification Search
CPC ........ F02C 7/224; F02C 7/143; F28D 7/0058; F28D 7/1653; F28D 21/0001;
(Continued)

(56) References Cited

U.S. PATENT DOCUMENTS 2,294,254 A * 8/1942 Throckmorton ......... C10G 9/20
122/356
2,407,165 A * 9/1946 Kreitner .................. F02C 7/143
60/39.53
(Continued)

FOREIGN PATENT DOCUMENTS

EP    2128419 A1    12/2009
FR    2482196 A1    11/1981

OTHER PUBLICATIONS

International Search Report and Written Opinion, PCT/US2012/072117, Aug. 27, 2013.
(Continued)

*Primary Examiner* — Pascal M Bui Pho
*Assistant Examiner* — Eric Linderman
(74) *Attorney, Agent, or Firm* — Fishman Stewart PLLC

(57) ABSTRACT

One embodiment of the present invention is a unique aircraft propulsion gas turbine engine. Another embodiment is a unique gas turbine engine. Another embodiment is a unique gas turbine engine. Other embodiments include apparatuses, systems, devices, hardware, methods, and combinations for gas turbine engines with heat exchange systems. Further embodiments, forms, features, aspects, benefits, and advantages of the present application will become apparent from the description and figures provided herewith.

19 Claims, 3 Drawing Sheets

Related U.S. Application Data

(60) Provisional application No. 61/581,850, filed on Dec. 30, 2011.

(51) Int. Cl.
   *F28F 9/26*    (2006.01)
   *F28D 21/00*   (2006.01)
   *F02C 7/141*   (2006.01)
   *F28F 9/02*    (2006.01)
   *F28D 7/00*    (2006.01)
   *F28D 7/16*    (2006.01)

(52) U.S. Cl.
   CPC ....... *F28D 7/1653* (2013.01); *F28D 21/0001* (2013.01); *F28F 9/026* (2013.01); *F28F 9/26* (2013.01); *F28F 2009/029* (2013.01); *Y02T 50/671* (2013.01); *Y02T 50/675* (2013.01)

(58) Field of Classification Search
   CPC .......... F28D 21/0008; F28D 2021/0026; F28F 9/026; F28F 9/26
   See application file for complete search history.

(56) References Cited

U.S. PATENT DOCUMENTS

| | | | | |
|---|---|---|---|---|
| 2,479,071 A * | 8/1949 | Henstridge | ........... | F28D 7/0058 165/155 |
| 2,575,683 A * | 11/1951 | Price | ............ | F02C 3/107 123/41.19 |
| 2,608,054 A * | 8/1952 | Price | ............ | B64C 21/025 290/4 C |
| 2,718,753 A * | 9/1955 | Bridgeman | ....... | F02C 7/143 60/39.465 |
| 3,064,947 A * | 11/1962 | Wynne | ............ | F28D 1/0471 165/149 |
| 3,228,464 A * | 1/1966 | Stein | ............ | F28D 9/0012 165/166 |
| 3,235,001 A * | 2/1966 | Giannotti | ............ | F01N 5/00 165/135 |
| 3,398,538 A * | 8/1968 | Hall | ............ | F02C 7/08 60/262 |
| 3,735,588 A * | 5/1973 | Moskowitz | ............ | F28D 7/08 165/135 |
| 3,747,339 A * | 7/1973 | Wolf | ............ | F02C 7/08 60/206 |
| 3,779,007 A * | 12/1973 | Lavash | ............ | F02C 7/14 60/241 |
| 3,831,674 A * | 8/1974 | Stein | ............ | F02C 7/08 165/166 |
| 4,254,618 A * | 3/1981 | Elovic | ............ | F02C 7/185 60/226.1 |
| 4,506,502 A * | 3/1985 | Shapiro | ............ | F02C 3/073 60/39.43 |
| 4,949,544 A * | 8/1990 | Hines | ............ | F01K 21/047 60/728 |
| 4,993,223 A * | 2/1991 | Kretzinger | ............ | F28D 9/0018 165/166 |
| 5,004,044 A * | 4/1991 | Horgan | ............ | F28D 9/0012 165/145 |
| 5,050,668 A * | 9/1991 | Peterson | ............ | F02C 7/08 165/166 |
| 5,161,365 A * | 11/1992 | Wright | ............ | F02C 7/16 60/39.461 |
| 5,165,224 A * | 11/1992 | Spadaccini | ............ | F02B 51/02 60/723 |
| 5,185,997 A * | 2/1993 | Nishijima | ............ | F02C 7/185 60/740 |
| 5,207,053 A * | 5/1993 | Spadaccini | ............ | F02B 51/02 60/723 |
| 5,317,877 A * | 6/1994 | Stuart | ............ | F02C 7/185 60/736 |
| 5,335,501 A | 8/1994 | Taylor | | |
| 5,392,595 A * | 2/1995 | Glickstein | ............ | F02C 7/224 60/39.12 |
| 5,553,448 A * | 9/1996 | Farrell | ............ | F02C 3/10 29/401.1 |
| 5,678,408 A | 10/1997 | Janes | | |
| 5,724,806 A * | 3/1998 | Horner | ............ | F02C 7/12 60/728 |
| 5,782,076 A * | 7/1998 | Huber | ............ | F02C 7/08 415/115 |
| 5,791,148 A * | 8/1998 | Burrus | ............ | F01D 5/18 60/749 |
| 5,992,139 A * | 11/1999 | Kesseli | ............ | F02C 6/12 60/39.183 |
| 6,253,554 B1 * | 7/2001 | Kobayashi | ............ | F02C 7/12 60/736 |
| 6,357,113 B1 * | 3/2002 | Williams | ............ | B23P 15/26 29/890.034 |
| 6,415,595 B1 * | 7/2002 | Wilmot, Jr. | ......... | B64D 13/006 60/266 |
| 6,422,020 B1 | 7/2002 | Rice | | |
| 6,430,931 B1 * | 8/2002 | Horner | ............ | F02C 7/143 60/785 |
| 6,672,072 B1 * | 1/2004 | Giffin, III | ............ | F01D 5/08 60/728 |
| 6,691,519 B2 * | 2/2004 | Little | ............ | F02C 1/00 415/912 |
| 7,334,407 B2 | 2/2008 | Spadaccini et al. | | |
| 7,459,081 B2 | 12/2008 | Koenig et al. | | |
| 7,568,336 B2 | 8/2009 | Brault et al. | | |
| 7,870,743 B2 * | 1/2011 | Lee | ............ | F01D 5/189 416/96 R |
| 7,874,139 B2 * | 1/2011 | Briesch | ............ | F01K 23/068 60/39.281 |
| 7,926,289 B2 * | 4/2011 | Lee | ............ | F01D 5/081 415/145 |
| 7,926,292 B2 * | 4/2011 | Rabovitser | ............ | F02C 3/205 60/730 |
| 7,954,324 B2 * | 6/2011 | Holland | ............ | F02C 6/18 60/736 |
| 8,721,265 B1 * | 5/2014 | Brostmeyer | ............ | F04D 19/02 415/1 |
| 8,943,827 B2 * | 2/2015 | Prociw | ............ | F01D 25/12 60/730 |
| 9,394,828 B2 * | 7/2016 | Eleftheriou | ............ | F02C 7/08 |
| 2002/0144664 A1 * | 10/2002 | Haldeman, III | ........ | C10L 1/328 123/25 B |
| 2004/0055740 A1 * | 3/2004 | Meshenky | ............ | F02B 29/0462 165/125 |
| 2005/0235626 A1 * | 10/2005 | Hull | ............ | F02C 7/08 60/39.511 |
| 2005/0262848 A1 * | 12/2005 | Joshi | ............ | F02C 3/305 60/772 |
| 2006/0064987 A1 * | 3/2006 | Veninger | ............ | F02C 7/224 60/777 |
| 2006/0080967 A1 * | 4/2006 | Colket, III | ............ | F23C 6/045 60/777 |
| 2006/0090472 A1 * | 5/2006 | Ritland | ............ | F02C 7/047 60/772 |
| 2006/0174627 A1 * | 8/2006 | McQuiggan | ............ | F02C 6/18 60/772 |
| 2007/0089423 A1 * | 4/2007 | Norman | ............ | F02C 7/143 60/772 |
| 2007/0101731 A1 * | 5/2007 | Bayt | ............ | B64D 13/06 62/7 |
| 2008/0083226 A1 * | 4/2008 | Joshi | ............ | F02C 3/34 60/772 |
| 2008/0083608 A1 * | 4/2008 | Cipollini | ............ | B01D 19/0084 204/157.5 |
| 2008/0142189 A1 * | 6/2008 | Norris | ............ | F02C 7/14 165/11.1 |
| 2008/0202094 A1 * | 8/2008 | Brault | ............ | F02C 7/143 60/226.1 |
| 2008/0310955 A1 * | 12/2008 | Norris | ............ | F02C 7/14 415/178 |
| 2009/0133400 A1 * | 5/2009 | Callas | ............ | F02C 7/224 60/730 |

(56) References Cited

U.S. PATENT DOCUMENTS

| | | | | |
|---|---|---|---|---|
| 2010/0058801 A1* | 3/2010 | Masani | ............... | F01D 15/005 62/611 |
| 2010/0319359 A1* | 12/2010 | Holt | ............... | F02C 6/08 60/782 |
| 2012/0128467 A1* | 5/2012 | Ruthemeyer | ............... | F01D 5/146 415/115 |
| 2012/0199335 A1* | 8/2012 | Maurer | ............... | F28D 7/0058 165/185 |
| 2012/0216543 A1* | 8/2012 | Eleftheriou | ............... | F02C 7/08 60/772 |
| 2013/0186059 A1* | 7/2013 | Epstein | ............... | F02C 3/22 60/205 |
| 2013/0219915 A1* | 8/2013 | Prociw | ............... | F02C 7/224 60/782 |
| 2013/0239542 A1* | 9/2013 | Dasgupta | ............... | F02C 7/143 60/39.093 |
| 2014/0216045 A1* | 8/2014 | Gueh | ............... | F02C 6/10 60/772 |
| 2014/0260178 A1* | 9/2014 | Eleftheriou | ............... | F02C 7/08 60/39.511 |
| 2015/0047367 A1* | 2/2015 | Benignos | ............... | F02C 7/143 60/782 |
| 2015/0298024 A1* | 10/2015 | Watkins | ............... | B01D 3/146 203/24 |
| 2015/0337730 A1* | 11/2015 | Kupiszewski | ............... | F02C 3/22 60/39.465 |
| 2016/0177829 A1* | 6/2016 | Loebig | ............... | F02C 7/18 415/1 |
| 2016/0237901 A1* | 8/2016 | Zelesky | ............... | F02C 7/143 |
| 2016/0237904 A1* | 8/2016 | Scarboro | ............... | F02C 7/143 |
| 2016/0305324 A1* | 10/2016 | Magowan | ............... | F02C 7/18 |
| 2016/0312702 A1* | 10/2016 | Thomas | ............... | F02C 7/18 |

OTHER PUBLICATIONS

English language translation of FR2482196, Boudigues, Nov. 13, 1981.

* cited by examiner

US 9,771,867 B2

GAS TURBINE ENGINE WITH AIR/FUEL HEAT EXCHANGER

CROSS REFERENCE TO RELATED APPLICATIONS

The present application is a continuation of PCT Application No. PCT/US2012/072117, filed Dec. 28, 2012, which claims the benefit of U.S. Provisional Patent Application No. 61/581,850 filed Dec. 30, 2011, each of which is incorporated herein by reference.

GOVERNMENT RIGHTS

The present application was made with United States government support under Contract No. NNH08ZEA001 N Amendment #2, awarded by NASA. The United States government may have certain rights in the present application.

FIELD OF THE INVENTION

The present invention relates to gas turbine engines, and more particularly, to gas turbine engines with heat exchange systems.

BACKGROUND

Gas turbine heat exchange systems that effectively transfer heat from pressurized compressor air to fuel remain an area of interest. Some existing systems have various shortcomings, drawbacks, and disadvantages relative to certain applications. Accordingly, there remains a need for further contributions in this area of technology.

SUMMARY

One embodiment of the present invention is a unique aircraft propulsion gas turbine engine. Another embodiment is a unique gas turbine engine. Another embodiment is another unique gas turbine engine. Other embodiments include apparatuses, systems, devices, hardware, methods, and combinations for gas turbine engines with heat exchange systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
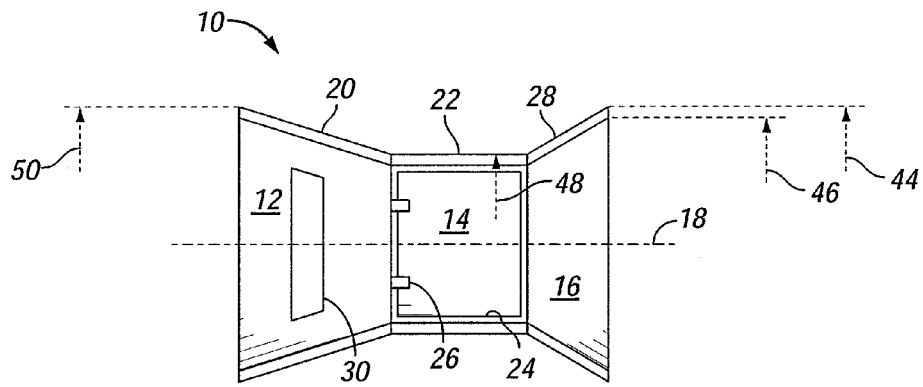
FIG. 1 schematically depicts some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of an engine 10 in accordance with an embodiment of the present invention are schematically depicted. Engine 10 is an aircraft propulsion gas turbine engine. Engine 10 includes a compressor system 12, a combustion system 14 in fluid communication with compressor system 12, and a turbine system 16 in fluid communication with combustion system 14. In one form, compressor system 12, combustion system 14 and turbine system 16 are disposed about an engine centerline 18, e.g., the axis of rotation of compressor system 12 and turbine system 16. In other embodiments, other arrangements may be employed. In various embodiments, engine 10 may be a single spool engine or a multi-spool engine. In various embodiments, engine 10 may or may not have a turbine system, or may have additional turbomachinery components in addition to a compressor system and/or a turbine system, e.g., a fan system. In some embodiments, engine 10 may be a direct propulsion engine that produces thrust directly from combustion system 14. In other embodiments, combustion system 14 may form a gas generator for a gas turbine propulsion system, or may be employed in a gas turbine engine topping cycle. In still other embodiments, engine 10 may be one or more of other types of gas turbine engines, hybrid engines and/or combined cycle engines.

Compressor system 12 includes a compressor case 20 that houses stationary and rotating compressor system 12 components. In various embodiments, compressor case 20 may be formed of one or more individual compressor case structures, e.g., depending on the number, size and location of compressor stages and/or the number of spools employed in engine 10. Combustion system 14 includes a combustor case 22, a combustor 24 and a plurality of fuel injectors 26. Combustor 24 receives pressurized air from compressor system 12. Fuel injectors 26 are configured to inject fuel into combustor 24. Combustor 24 is configured to combust the fuel injected therein by fuel injectors 26 with pressurized air received from compressor system 12. Turbine system 16 includes a turbine case 28 that houses stationary and rotating turbine system 16 components. In various embodiments, turbine case 28 may be formed of one or more individual turbine case structures, e.g., depending on the number, size and location of turbine stages and/or the number of spools employed in engine 10.

Engine 10 includes a heat exchanger 30 fluidly disposed between two compressor stages and in fluid communication with fuel injectors 26. Heat exchanger 30 is configured to cool pressurized airflow in compressor system 12 by heat exchange with the fuel supplied to fuel injectors 26, and to heat the fuel by heat exchange with the pressurized airflow in compressor system 12.

Figure 2:
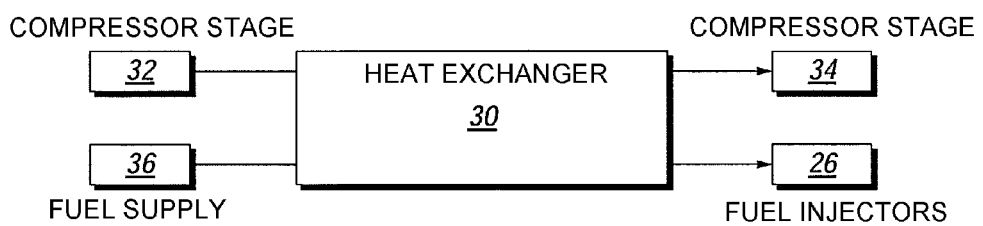
FIG. 2 schematically illustrates some aspects of non-limiting examples of a heat exchanger and a gas turbine engine in accordance with an embodiment of the present invention.

Referring to FIG. 2, in conjunction with FIG. 1, some aspects of non-limiting examples of heat exchanger 30 and engine 10 in accordance with an embodiment of the present invention are schematically depicted. Heat exchanger 30 is an air/fuel heat exchanger that is configured to exchange heat between compressor system 12 air and the fuel supplied to fuel injectors 26 without the use of an intermediate heat transfer fluid. Heat exchanger 30 is disposed within engine 10. That is, disposed within one or more engine 10 cases, as opposed to being disposed external to gas turbine engine 10, which requires external ducting to duct the pressurized air to and from heat exchanger 30 from and to compressor stages within engine 10. By being internal to engine 10, heat exchanger 30 does not increase the frontal area of engine 10, which would otherwise adversely impact the flight characteristics and frontal area drag of the aircraft or air-vehicle into which engine 10 is installed as a propulsion power plant. In one form, heat exchanger 30 is an annular heat exchanger, extending annularly around engine centerline 18. In other embodiments, heat exchanger 30 may take other forms.

Heat exchanger 30 is in fluid communication with and fluidly disposed between a compressor stage 32 and a compressor stage 34. Combustor 24 is fluidly disposed downstream of compressor stage 34. Compressor stage 32 is a lower pressure compressor stage than compressor stage 34. Compressor stage 32 is configured to produce a pressurized airflow, which is received by compressor stage 34 after having passed through heat exchanger 30. In one form, compressor stage 34 is a final compressor stage, and combustor 24 is configured to receive compressor discharge air from compressor stage 34 for combustion, e.g., via a diffuser. In other embodiments, compressor stage 34 may not be a final compressor stage.

Heat exchanger 30 is also in fluid communication with a fuel supply 36 and fuel injectors 26. Fuel supply 36 is operative to supply fuel to heat exchanger 30 for subsequent delivery to fuel injectors 26 after having performed heat exchange between pressurized air from compressor stage 32 and the fuel prior to delivery of the fuel to fuel injectors 26. Heat exchanger 30 is configured to receive the pressurized air flow from compressor stage 32, to discharge the pressurized air flow to compressor stage 34; to heat the fuel by heat exchange with the pressurized air flow prior to delivery of the fuel to fuel injector 26; and to cool the pressurized air flow by heat exchange with the fuel prior to delivery of the pressurized air flow to compressor stage 34.

Figure 3:
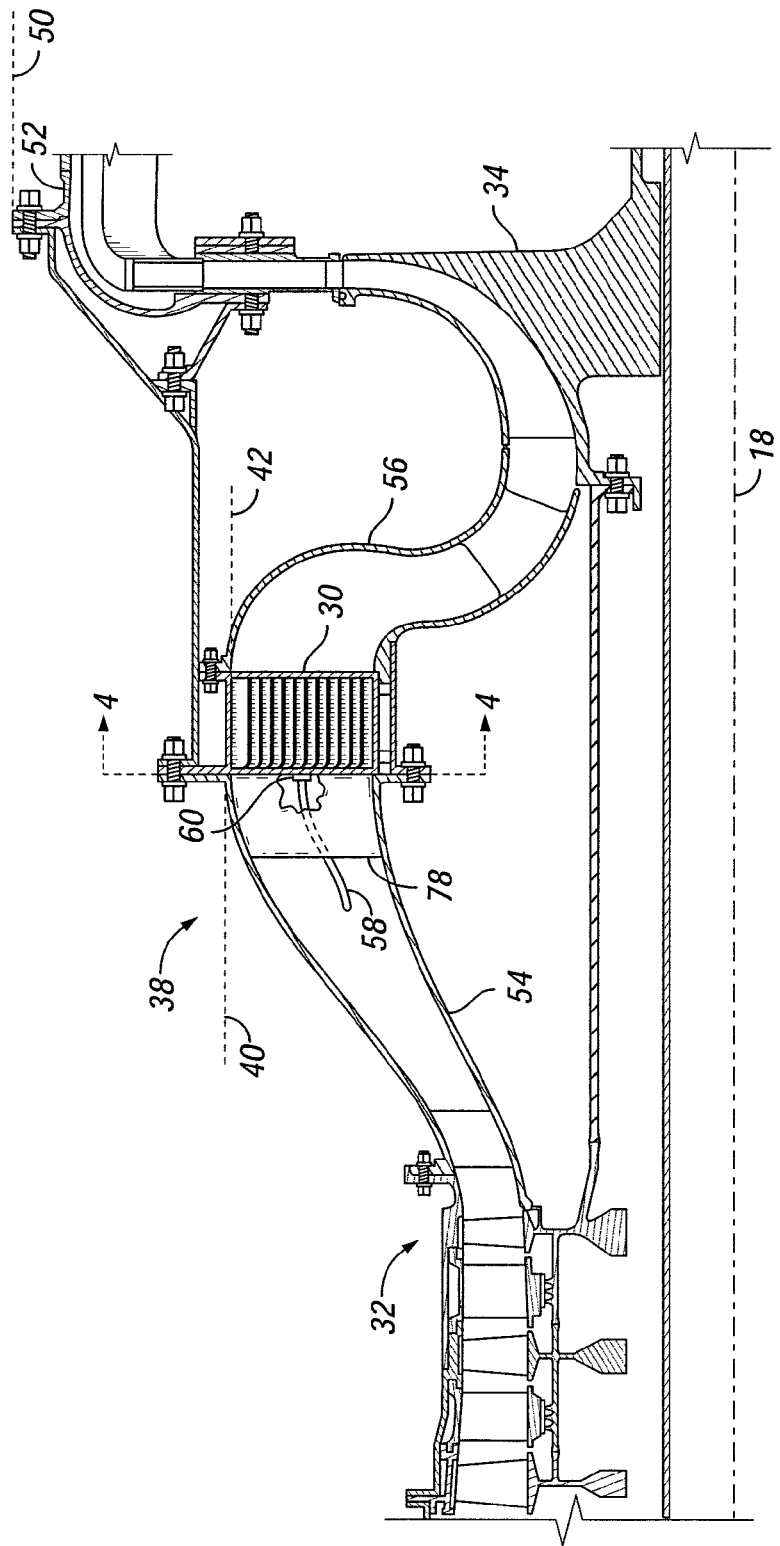
FIG. 3 schematically illustrates some aspects of non-limiting examples of a heat exchanger and a compressor system in accordance with an embodiment of the present invention.

Referring to FIG. 3, some aspects of non-limiting examples of heat exchanger 30 and compressor system 12 in accordance with an embodiment of the present invention are schematically depicted. In one form, compressor stage 32 is an axial compressor stage, whereas compressor stage 34 is a centrifugal compressor stage. In other embodiments, compressor stages 32 and 34 take other forms, e.g., including both compressor stages 32 and 34 being axial compressor stages; both compressor stages 32 and 34 being centrifugal compressor stages; or compressor stage 32 being a centrifugal compressor stage and compressor stage 34 being an axial compressor stage.

Disposed between and fluidly coupling compressor stage 32 and compressor stage 34 is a primary flowpath 38. In one form, primary flowpath 38 is annular, extending annularly around engine centerline 18 and forming an annulus therein. In other embodiments, primary flowpath 38 may take other forms. Heat exchanger 30 is disposed within primary flowpath 38, between compressor stage 32 and compressor stage 34. Primary flowpath 38 is configured to deliver the pressurized air flow from compressor stage 32 to heat exchanger 30 and then to compressor stage 34. Primary flowpath 38 is disposed within engine 10, that is, disposed within one or more engine 10 cases, as opposed to being disposed external to gas turbine engine 10. By being disposed internal to engine 10, primary flowpath 38 does not include any engine 10 external ducting to duct pressurized air to and from heat exchanger 30 from and to compressor stages 32 and 34 within engine 10. By being internal to engine 10, primary flowpath 38 does not increase the frontal area of engine 10, which would otherwise adversely impact the flight characteristics or frontal area drag of the aircraft or air-vehicle into which engine 10 is installed as a propulsion power plant.

In one form, primary flowpath 38 has a maximum radial extent 40, relative to engine centerline 18, and heat exchanger 30 has a maximum radial extent 42, relative to engine centerline 18, that do not exceed the maximum radial extent 44 relative to engine centerline 18, (FIG. 1), of turbine case 28. In one form, maximum radial extent 40 of primary flowpath 38 and/or maximum radial extent 42 of heat exchanger 30 do not exceed the maximum radial extent 46, relative to engine centerline 18 (FIG. 1), of a turbine blade tip diameter of turbine system 16. In one form, maximum radial extent 40 of primary flowpath 38 and maximum radial extent 42 of heat exchanger 30 do not exceed the maximum radial extent 48, relative to engine centerline 18 (FIG. 1), of combustor case 22. In one form, maximum radial extent 40 of primary flowpath 38 and maximum radial extent 42 of heat exchanger 30 do not exceed the maximum radial extent 50, relative to engine centerline 18 (FIG. 1), of compressor case 20, e.g., a high pressure (HP) compressor case 52, which surrounds and houses compressor stage 34. In other embodiments, maximum radial extent 40 of primary flowpath 38 and maximum radial extent 42 of heat exchanger 30 may be disposed within the radial extents of other engine 10 components.

Primary flowpath 38 includes a diffuser portion 54 and a converging portion 56. Diffuser portion 54 is fluidly disposed upstream of heat exchanger 30. Diffuser portion 54 is configured to diffuse the air pressurized by compressor stage 32 prior to entry of the pressurized air into heat exchanger 30. Converging portion 56 is fluidly disposed downstream of heat exchanger 30. Converging portion 56 is configured to reduce the flow area in primary flowpath 38 and to increase the velocity of the air pressurized by compressor stage 32 after the pressurized air has passed through heat exchanger 30, prior to delivery of the pressurized air to compressor stage 34.

In one form, disposed within diffuser portion 54 is a flow splitter 58. Some embodiments may not include a flow splitter. Flow splitter 58 is configured to prevent or reduce separation of the pressurized air flow from the walls of diffuser portion 54 upstream of heat exchanger 30. In one form, flow splitter 58 is configured to enable a more aggressive diffusion angle in diffuser portion 54 than the diffusion angle of a diffuser portion not having a flow splitter, e.g., which allows a reduction in the length of diffuser portion 54 relative to embodiments not equipped with flow splitter 58. In one form, flow splitter 58 is positioned proximate to heat exchanger 30, e.g., immediately adjacent to heat exchanger 30, to prevent recirculation of the pressurized air downstream of flow splitter 58 (between flow splitter 58 and heat exchanger 30), e.g., owing to potential pressure differentials between locations above and below splitter 58, e.g., which may otherwise yield an effective flow blockage. In some embodiments, a seal 60 is disposed between flow splitter 58 and heat exchanger 30 in order to further prevent recirculation downstream of flow splitter 58. Seal 60 may take any form suitable for fitment and sealing between flow splitter 58 and heat exchanger 30.

Figure 4:
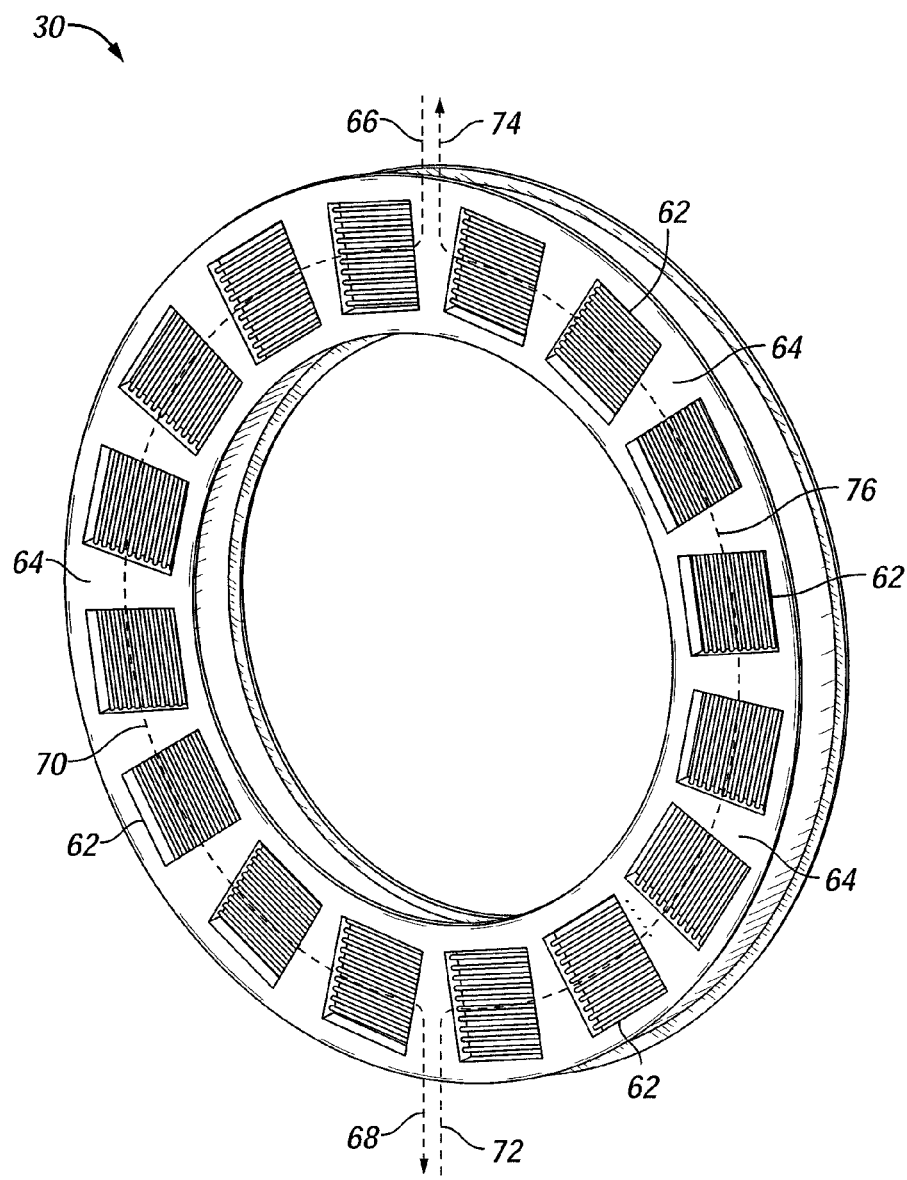
FIG. 4 schematically illustrates some aspects of a non-limiting example of a heat exchanger in accordance with an embodiment of the present invention.

Referring to FIG. 4 in conjunction with FIG. 3, some aspects of a non-limiting example of heat exchanger 30 in accordance with an embodiment of the present invention are schematically depicted. For clarity of illustration, only heat exchanger 30 is illustrated in FIG. 4. As set forth previously, in one form, heat exchanger 30 is an annular heat exchanger. In a particular form, heat exchanger 30 is formed of a plurality of individual heat exchanger modules 62. In one form, heat exchanger modules 62 are equally spaced apart circumferentially and arranged annularly within primary flowpath 38, between diffuser portion 54 and converging portion 56. In other embodiments, heat exchanger modules 62 may be arranged differently.

In one form, heat exchanger 30 includes sixteen heat exchanger modules 62. In other embodiments, the number and size of heat exchanger modules 62 may vary with the needs of the particular application. In one form, heat exchanger modules 62 are plate-and-fin heat exchanger modules. In other embodiments, heat exchanger modules 62 may take other forms. In one form, heat exchanger modules 62 are configured for cross-flow heat exchange between the fuel and the air pressurized by compressor stage 32. In other embodiments, other heat exchange configurations may be employed in place of or in addition to cross-flow, e.g., counter-flow, parallel flow and/or mixed flow.

Disposed between heat exchanger modules 62 are fuel distribution manifolds 64. Fuel distribution manifolds 64 are in fluid communication with adjacent heat exchanger modules 62, and are configured to transmit fuel between the adjacent heat exchanger modules 62. In one form, fuel distribution manifolds are pie-shaped, owing to the shape of heat exchanger modules 62. In other embodiments, other suitable shapes may be employed. In one form, heat exchanger 30 is effectively split into two parallel heat exchanger halves with a fuel inlet 66 and a fuel outlet 68 for distributing fuel in a generally circumferential direction 70 through one side of heat exchanger 30; and with a fuel inlet 72 and a fuel outlet 74 for distributing fuel in a generally circumferential direction 76 through the other side of heat exchanger 30. By effectively splitting heat exchanger 30 into two parallel heat exchangers, the circumferential variation in heat transfer to the pressurized air flow provided by compressor stage 32 is reduced. In other embodiments, only a single fuel inlet and a single fuel outlet may be employed, e.g., for distributing the fuel around the entire heat exchanger 30. In still other embodiments, a plurality of fuel inlets and/or fuel outlets may be employed to distribute fuel in parallel through smaller segments of heat exchanger 30, e.g., to further reduce the circumferential variation in heat transferred to the pressurized air flow provided by compressor stage 32.

In one form, disposed immediately upstream of each fuel distribution manifold 64 is a leading transition 78. Leading transitions 78 are configured to guide the pressurized airflow around fuel distribution manifolds 64 and into heat exchanger modules 62, which reduces pressure losses in the pressurized air flow from compressor stage 32. In some embodiments, trailing transitions may also be positioned downstream of fuel distribution manifolds 64 to reduce pressure losses in air flow exiting heat exchanger 30.

In one form, the fuel used by engine 10 is an endothermic fuel, and combustor 24, fuel injectors 26 and air/fuel heat exchanger 30 are configured for use with the endothermic fuel. Endothermic fuel is a fuel having the fuel molecules pre-split in a manner that does not adversely affect the latent heating value of the fuel. In one form, endothermic fuel has a temperature limit of approximately 900° F. As the allowable fuel temperature increases, more heat can be transferred to the fuel from the pressurized air flow provided by compressor stage 32 via heat exchanger 30, which increases the specific fuel consumption (SFC) benefit to engine 10 from the use of heat exchanger 30, relative to the use of lower temperature-capable fuels. Additionally, by using a high temperature capable fuel, purging of heat exchanger 30 after engine 10 shutdown may not be required to avoid fuel coking at high temperatures, e.g., high operating temperatures and hot soak-back conditions. Hence, such embodiments may not require a purge system, reducing the cost and weight of engine 10 relative to systems that do require a purge system.

In other embodiments, the fuel used by engine 10 is a deox fuel, and combustor 24, fuel injectors 26 and air/fuel heat exchanger 30 are configured for use with the deox fuel. Deox fuel is a fuel that has been processed to remove oxygen from the fuel. In one form, deox fuel has a temperature limit of approximately 600° F. As the allowable fuel temperature increases, more heat can be transferred to the fuel from the pressurized air flow provided by compressor stage 32 via heat exchanger 30, which increases the SFC benefit to engine 10 from the use of heat exchanger 30, relative to the use of lower temperature-capable fuels. Additionally, by using a higher temperature-capable fuel, purging of heat exchanger 30 after engine 10 shutdown may not be required to avoid fuel coking at high temperatures, e.g., high operating temperatures and hot soak-back conditions. Hence, such embodiments may not require a purge system, reducing the cost and weight of engine 10 relative to systems that do require a purge system.

In still other embodiments, the fuel used by engine 10 is a conventional gas turbine engine fuel, e.g., JP-8, and combustor 24, fuel injectors 26 and air/fuel heat exchanger 30 are configured for use with the conventional fuel. In one form, conventional fuel has a temperature limit of approximately 450° F.

Embodiments of the present invention include an aircraft propulsion gas turbine engine, comprising: a first compressor stage configured to produce a pressurized air flow; a second compressor stage disposed downstream of the first compressor stage; a primary annular flowpath fluidly coupling the first compressor stage and the second compressor stage, wherein the primary annular flowpath is disposed within the aircraft propulsion gas turbine engine; a combustor disposed downstream of the second compressor stage; a fuel injector configured to inject a fuel into the combustor, wherein the combustor is configured to combust the fuel injected therein by the fuel injector; and an air/fuel heat exchanger disposed in the primary annular flowpath, wherein the air/fuel heat exchanger is in fluid communication with the fuel injector, the first compressor stage and the second compressor stage; and wherein the air/fuel heat exchanger is configured to receive the pressurized air flow from the first compressor stage, to discharge the pressurized air flow to the second compressor stage, to heat the fuel by heat exchange with the pressurized air flow prior to delivery of the fuel to the fuel injector, and to cool the pressurized air flow by heat exchange with the fuel.

In a refinement, the air/fuel heat exchanger is an annular heat exchanger.

In another refinement, the annular heat exchanger includes a plurality of individual heat exchanger modules arranged annularly within the primary annular flowpath to form the annular heat exchanger.

In yet another refinement, the air/fuel heat exchanger includes a plate-and-fin heat exchanger.

In still another refinement, the fuel is a deox fuel; and the combustor, the fuel injector and the air/fuel heat exchanger are configured for use with the deox fuel.

In yet still another refinement, the fuel is an endothermic fuel; and the combustor, the fuel injector and the air/fuel heat exchanger are configured for use with the endothermic fuel.

In a further refinement, the aircraft propulsion gas turbine engine further comprises an engine case, wherein a maximum radial extent of the primary annular flowpath is less than a maximum radial extent of the engine case.

In a yet further refinement, the engine case is one of a compressor case, a combustor case and a turbine case.

In a still further refinement, the engine case is an HP compressor case.

Embodiments of the present invention include a gas turbine engine, comprising: a first compressor stage configured to produce a pressurized air flow; a second compressor stage disposed downstream of the first compressor stage; a combustor disposed downstream of the second compressor stage; a fuel injector configured to inject a fuel into the combustor, wherein the combustor is configured to combust the fuel injected therein by the fuel injector; and an air/fuel heat exchanger fluidly disposed between the first compressor stage and the second compressor stage, wherein the air/fuel heat exchanger is in fluid communication with the fuel injector, the first compressor stage and the second compressor stage; and wherein the air/fuel heat exchanger is configured to receive the pressurized air flow from the first compressor stage, to discharge the pressurized air flow to the second compressor stage, to heat the fuel by heat exchange with the pressurized air flow prior to delivery of the fuel to the fuel injector, and to cool the pressurized air flow by heat exchange with the fuel prior to delivery of the pressurized air flow to the second compressor stage, wherein air/fuel heat exchanger is disposed within the gas turbine engine.

In a refinement, the gas turbine engine further comprises a primary annular flowpath fluidly coupling the first compressor stage and the second compressor stage, wherein the air/fuel heat exchanger is disposed within the primary annular flowpath.

In another refinement, the primary annular flowpath includes a diffuser portion upstream of the air/fuel heat exchanger and a converging portion downstream of the air/fuel heat exchanger.

In yet another refinement, the gas turbine engine further comprises a flow splitter disposed in the diffuser portion proximate to the air/fuel heat exchanger, wherein the flow splitter is configured to prevent or reduce flow separation in the diffuser portion.

In still another refinement, the gas turbine engine further comprises a seal disposed between the flow splitter and the air/fuel heat exchanger.

In yet another refinement, the gas turbine engine further comprises an engine case, wherein a maximum radial extent of the air/fuel heat exchanger is less than a maximum radial extent of the engine case.

In yet still another refinement, the engine case is one of a compressor case, a combustor case and a turbine case.

In a further refinement, the engine case is an HP compressor case.

In a yet further refinement, the gas turbine engine is configured as an aircraft propulsion gas turbine engine.

Embodiments of the present invention include a gas turbine engine, comprising: a first compressor stage configured to produce a pressurized air flow; a second compressor stage disposed downstream of the first compressor stage; a combustor disposed downstream of the second compressor stage; a fuel injector configured to inject a fuel into the combustor, wherein the combustor is configured to combust the fuel injected therein by the fuel injector; and means for cooling the pressurized air flow prior to delivery of the pressurized air flow to the second compressor stage and for heating the fuel prior to delivery of the fuel to the fuel injector.

In a refinement, the gas turbine engine further comprising an engine case, wherein a maximum radial extent of the means for cooling and for heating is less than a maximum radial extent of the engine case; and wherein the gas turbine engine is configured as an aircraft propulsion gas turbine engine.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An aircraft propulsion gas turbine engine, comprising:
   a first compressor stage configured to produce a pressurized air flow;
   a second compressor stage disposed downstream of the first compressor stage;
   a primary annular flowpath fluidly coupling the first compressor stage and the second compressor stage, wherein the primary annular flowpath is disposed within the aircraft propulsion gas turbine engine;
   a combustor disposed downstream of the second compressor stage;
   a fuel injector configured to inject a fuel into the combustor, wherein the combustor is configured to combust the fuel injected therein by the fuel injector; and
   an air/fuel heat exchanger disposed in the primary annular flowpath, the air/fuel heat exchanger including a first flowpath and a second flowpath, the first flowpath having a first fuel inlet and a first fuel outlet for distributing fuel in a first direction through a first side of the air/fuel heat exchanger, and the second flowpath having a second fuel inlet and a second fuel outlet for distributing fuel in a second direction through a second side of the air/fuel heat exchanger;
   wherein the air/fuel heat exchanger is an annular heat exchanger with the first direction being a first circumferential direction and the second direction being a second circumferential direction;
wherein the air/fuel heat exchanger is in fluid communication with the fuel injector, the first compressor stage and the second compressor stage; and
wherein the air/fuel heat exchanger is configured to receive the pressurized air flow from the first compressor stage, to discharge the pressurized air flow to the second compressor stage, to heat the fuel by heat exchange with the pressurized air flow prior to delivery of the fuel to the fuel injector, and to cool the pressurized air flow by heat exchange with the fuel.

2. The aircraft propulsion gas turbine engine of claim 1, wherein the annular heat exchanger includes a plurality of individual heat exchanger modules, the plurality of individual heat exchanger modules being spaced apart circumferentially and arranged annularly within the primary annular flowpath to form the annular heat exchanger.

3. The aircraft propulsion gas turbine engine of claim 1, wherein the air/fuel heat exchanger includes a plate-and-fin heat exchanger.

4. The aircraft propulsion gas turbine engine of claim 1, wherein the fuel is a deox fuel; and wherein the combustor, the fuel injector and the air/fuel heat exchanger are configured for use with the deox fuel.

5. The aircraft propulsion gas turbine engine of claim 1, wherein the fuel is an endothermic fuel; and wherein the combustor, the fuel injector and the air/fuel heat exchanger are configured for use with the endothermic fuel.

6. The aircraft propulsion gas turbine engine of claim 1, further comprising an engine case, wherein the primary annular flowpath is narrower than the engine case.

7. The aircraft propulsion gas turbine engine of claim 6, wherein the engine case is one of a compressor case, a combustor case and a turbine case.

8. The aircraft propulsion gas turbine engine of claim 6, wherein the engine case is a HP compressor case.

9. A gas turbine engine, comprising:
a first compressor stage configured to produce a pressurized air flow;
a second compressor stage disposed downstream of the first compressor stage;
a combustor disposed downstream of the second compressor stage;
a fuel injector configured to inject a fuel into the combustor, wherein the combustor is configured to combust the fuel injected therein by the fuel injector; and
an air/fuel heat exchanger fluidly disposed between the first compressor stage and the second compressor stage, the air/fuel heat exchanger including a first flowpath and a second flowpath, the first flowpath having a first fuel inlet and a first fuel outlet for distributing fuel in a first direction through a first side of the air/fuel heat exchanger, and the second flowpath having a second fuel inlet and a second fuel outlet for distributing fuel in a second direction through a second side of the air/fuel heat exchanger,
wherein the air/fuel heat exchanger is an annular heat exchanger with the first direction being a first circumferential direction and the second direction being a second circumferential direction, and
wherein the air/fuel heat exchanger is in fluid communication with the fuel injector, the first compressor stage and the second compressor stage; and wherein the air/fuel heat exchanger is configured to receive the pressurized air flow from the first compressor stage, to discharge the pressurized air flow to the second compressor stage, to heat the fuel by heat exchange with the pressurized air flow prior to delivery of the fuel to the fuel injector, and to cool the pressurized air flow by heat exchange with the fuel prior to delivery of the pressurized air flow to the second compressor stage, wherein the air/fuel heat exchanger is disposed within the gas turbine engine.

10. The gas turbine engine of claim 9, further comprising a primary annular flowpath fluidly coupling the first compressor stage and the second compressor stage, wherein the air/fuel heat exchanger is disposed within the primary annular flowpath.

11. The gas turbine engine of claim 10, wherein the primary annular flowpath includes a diffuser portion upstream of the air/fuel heat exchanger and a converging portion downstream of the air/fuel heat exchanger.

12. The gas turbine engine of claim 11, further comprising a flow splitter disposed in the diffuser portion proximate to the air/fuel heat exchanger, wherein the flow splitter is configured to prevent or reduce flow separation in the diffuser portion.

13. The gas turbine engine of claim 12, further comprising a seal disposed between the flow splitter and the air/fuel heat exchanger.

14. The gas turbine engine of claim 9, further comprising an engine case, wherein the air/fuel heat exchanger is narrower than the engine case.

15. The gas turbine engine of claim 14, wherein the engine case is one of a compressor case, a combustor case and a turbine case.

16. The gas turbine engine of claim 14, wherein the engine case is a HP compressor case.

17. The gas turbine engine of claim 9, configured as an aircraft propulsion gas turbine engine.

18. A gas turbine engine, comprising:
a first compressor stage configured to produce a pressurized air flow;
a second compressor stage disposed downstream of the first compressor stage;
a combustor disposed downstream of the second compressor stage;
a fuel injector configured to inject a fuel into the combustor, wherein the combustor is configured to combust the fuel injected therein by the fuel injector; and
a heat exchanger including a first flowpath and a second flowpath, the first flowpath having a first fuel inlet and a first fuel outlet for distributing fuel in a first direction through a first side of the heat exchanger, and the second flowpath having a second fuel inlet and a second fuel outlet for distributing fuel in a second direction through a second side of the heat exchanger,
wherein the air/fuel heat exchanger is an annular heat exchanger with the first direction being a first circumferential direction and the second direction being a second circumferential direction, and
wherein the heat exchanger is configured to cool the pressurized air flow prior to delivery of the pressurized air flow to the second compressor stage and to heat the fuel prior to delivery of the fuel to the fuel injector.

19. The gas turbine engine of claim 18, further comprising an engine case, wherein the heat exchanger is narrower than the engine case, and wherein the gas turbine engine is configured for aircraft propulsion.

* * * * *